United States Patent
Kamalakar

(10) Patent No.: US 12,537,378 B2
(45) Date of Patent: Jan. 27, 2026

(54) METHODS, SYSTEMS, APPARATUSES, AND DEVICES FOR MANAGING TRANSFERRING OF ELECTRICAL POWER

(71) Applicant: Mayur Kamalakar, Tyngsboro, MA (US)

(72) Inventor: Mayur Kamalakar, Tyngsboro, MA (US)

( * ) Notice: Subject to any disclaimer, the term of this patent is extended or adjusted under 35 U.S.C. 154(b) by 79 days.

(21) Appl. No.: 18/610,316

(22) Filed: Mar. 20, 2024

(65) Prior Publication Data

US 2024/0258794 A1 Aug. 1, 2024

(51) Int. Cl.
*H02J 3/00* (2006.01)
*G06Q 50/06* (2024.01)
*H02J 7/00* (2006.01)

(52) U.S. Cl.
CPC .......... *H02J 3/0075* (2020.01); *G06Q 50/06* (2013.01); *H02J 7/00032* (2020.01); *H02J 7/0047* (2013.01); *H02J 7/00712* (2020.01); *H02J 2207/20* (2020.01)

(58) Field of Classification Search
CPC .. H02J 3/0075; H02J 7/00032; H02J 7/00712; H02J 7/0047; H02J 2207/20; G06Q 50/06
See application file for complete search history.

(56) References Cited

U.S. PATENT DOCUMENTS 12,036,886 B2 * 7/2024 Namuduri ............... B60L 53/14

\* cited by examiner

*Primary Examiner* — Carlos Amaya

(57) ABSTRACT

A system for managing transferring of electrical power includes a power converter and a controller. The power converter is configured for receiving input power from a power source through a first connector, converting the input power to output power using a power conversion information based on the receiving, and supplying the output power to a power storage device through a second connector based on the converting. The power storage device includes an ultra-wideband gap semiconductor material. The supplying of the output power includes charging the power storage device based on the output power and the ultra-wideband gap semiconductor material. The power storage device stores power based on the charging. The controller is communicatively coupled with the power converter. The controller is configured for generating the power conversion information.

20 Claims, 17 Drawing Sheets

METHODS, SYSTEMS, APPARATUSES, AND DEVICES FOR MANAGING TRANSFERRING OF ELECTRICAL POWER

FIELD OF THE INVENTION

Generally, the present disclosure relates to the field of electricity. More specifically, the present disclosure relates to methods, systems, apparatuses, and devices for managing transferring of electrical power.

BACKGROUND OF THE INVENTION

Existing techniques for managing transferring of electrical power are deficient with regard to several aspects. For instance, current technologies use power storage devices that are lithium-ion power storage devices or silicon-based energy power devices for storing power, and these power storage devices are inefficient. As a result, different technologies are needed that use different energy storage devices which are efficient Furthermore, current technologies manage transferring of power from a single power source. As a result, different technologies are needed that manage transferring of power from multiple sources. Moreover, current technologies only manage unidirectional transfer of power. As a result, different technologies are needed that manage bidirectional transfer of power.

Therefore, there is a need for improved methods, systems, apparatuses, and devices for managing transferring of electrical power that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for managing transferring of electrical power, in accordance with some embodiments. Accordingly, the system may include at least one power converter and a controller. Further, the at least one power converter may be configured for receiving at least one input power from at least one power source through at least one first connector. Further, the at least one input power may be associated with at least one input power characteristic. Further, the at least one first connector electrically couples the at least one power converter with the at least one power source. Further, the at least one power converter may be configured for converting the at least one input power to at least one output power using at least one power conversion information based on the receiving. Further, the at least one output power may be associated with at least one output power characteristic. Further, the at least one power converter may be configured for supplying the at least one output power to at least one power storage device through at least one second connector based on the converting. Further, the at least one second connector electrically couples the at least one power converter with the at least one power storage device. Further, the at least one power storage device may include at least one ultra-wideband gap semiconductor material. Further, the supplying of the at least one output power may include charging the at least one power storage device based on the at least one output power and the at least one ultra-wideband gap semiconductor material. Further, the at least one power storage device stores at least one power based on the charging. Further, the controller may be communicatively coupled with the at least one power converter. Further, the controller may be configured for generating the at least one power conversion information.

Further disclosed herein is a system for managing transferring of electrical power, in accordance with some embodiments. Accordingly, the system may include at least one power converter and a controller. Further, the at least one power converter may be configured for receiving at least one input power from at least one power source through at least one first connector. Further, the at least one input power may be associated with at least one input power characteristic. Further, the at least one first connector electrically couples the at least one power converter with the at least one power source. Further, the at least one power converter may be configured for converting the at least one input power to at least one output power using at least one power conversion information based on the receiving. Further, the at least one output power may be associated with at least one output power characteristic. Further, the at least one power converter may be configured for supplying the at least one output power to at least one power storage device through at least one second connector based on the converting. Further, the at least one second connector electrically couples the at least one power converter with the at least one power storage device. Further, the at least one power storage device may include at least one ultra-wideband gap semiconductor material. Further, the at least one power storage device may include at least one battery cell. Further, each of the at least one battery cell may include an anode, a cathode, and a separator disposed between the cathode and the anode. Further, at least one of the anode and the cathode of the at least one battery cell may include the at least one ultra-wideband gap semiconductor material. Further, the supplying of the at least one output power may include charging the at least one power storage device based on the at least one output power and the at least one ultra-wideband gap semiconductor material. Further, the at least one power storage device stores at least one power based on the charging. Further, the controller may be communicatively coupled with the at least one power converter. Further, the controller may be configured for generating the at least one power conversion information.

Further disclosed herein is a system for managing transferring of electrical power, in accordance with some embodiments. Accordingly, the system may include at least one power converter, a controller, and at least one switching element. Further, the at least one power converter may be configured for receiving at least one input power from at least one of a plurality of power sources through at least one of a plurality of first connectors. Further, the at least one input power may be associated with at least one input power characteristic. Further, at least one of the plurality of first connectors electrically couples the at least one power converter with at least one of the plurality of power sources. Further, the at least one power converter may be configured for converting the at least one input power to at least one output power using at least one power conversion information based on the receiving. Further, the at least one output power may be associated with at least one output power characteristic. Further, the at least one power converter may be configured for supplying the at least one output power to at least one power storage device through at least one second connector based on the converting. Further, the at least one second connector electrically couples the at least one power converter with the at least one power storage device. Further, the at least one power storage device may include at least one ultra-wideband gap semiconductor material. Further, the supplying of the at least one output power may include charging the at least one power storage device based on the at least one output power and the at least one ultra-wideband gap semiconductor material. Further, the at least one power storage device stores at least one power based on the charging. Further, the controller may be communicatively coupled with the at least one power converter. Further, the controller may be configured for generating the at least one power conversion information. Further, the at least one switching element may be operatively coupled with each of the plurality of first connectors. Further, the at least one switching element may be configured for establishing at least one electrical connection between the at least one power converter and at least one of the plurality of power sources through at least one of the plurality of first connectors. Further, the receiving of the at least one input power may be based on the establishing of the at least one electrical connection between the at least one power converter and at least one of the plurality of power sources through at least one of the plurality of first connectors.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
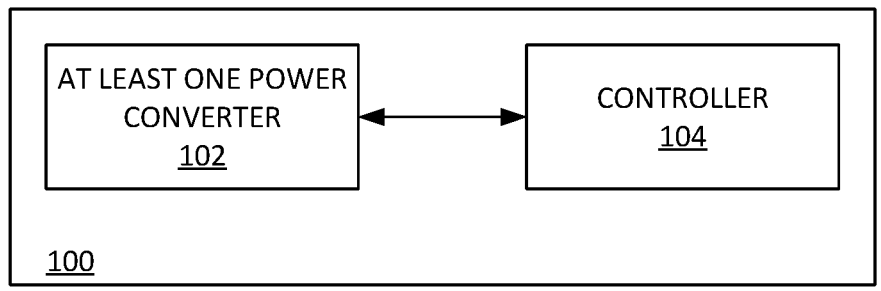
FIG. 1 is a block diagram of a system 100 for managing transferring of electrical power, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for managing transferring of electrical power, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for managing transferring of electrical power.

Further, the present disclosure describes a battery storage electric vehicle (EV) charger with a solar option. Further, the charger is used for charging battery storage. Further, the ultra-wideband gap semiconductor may be integrated into the battery storage to increase charging speeds, fast switching between power frequencies, and significantly reduce the size of the battery pack. Further, the charger implements LoRaWAN transmitter technology, meteorological sensors, and various weather sensors that intelligently make the decisions to determine the power source for the charger (either directly from the grid or from other renewable sources).

Further, the present disclosure describes a smart EV charger coupled with ultra-wideband gap semiconductor battery storage for fast EV charging. The incorporation of ultra-wideband gap semiconductors in the battery improves the performance of the battery in a wide range of applications.

Further, the present disclosure describes innovations for an EV charger. Further, the innovations include coupling high efficiency, boost performance batteries with the EV charger and coupling a solar power generation device, and gird with the EV charger to make a smart EV charger.

Further, the smart EV charger has huge applications in the electric vehicle market. Further, the smart EV charger may also have huge usage in renewable power plants. Further, the batteries may also be used at homes to store power, when there is a peak demand in the grid, the power from these batteries can be fed into the grid for grid stabilization. Further, the smart EV charger may use two sources of power and intelligently make a decision on which sources of power to use for charging the EV.

Further, the present disclosure describes a smart EV charger that may quickly switch between sources of power intelligently to seek power from either a solar power source or a grid. Further, the smart EV charger incorporates LoRaWAN technology that lets the smart EV charger to feed back the power from battery storage into the grid at peak demand. Further, the smart EV charger incorporates various weather sensors and transmitters. Further, the battery storage implements ultra-wide band gap semiconductors in the battery to increase the output voltage significantly and thus lead to faster EV charging. Further, the implementation of the ultra-wideband gap semiconductors makes the battery smaller compared to regular lithium-ion or silicon-based batteries, which makes it a compact size product, but with higher efficiency. By implementing the ultra-wide band gap semiconductors, the battery's life cycle increases with slow degradation.

Further, the present disclosure describes an Ultra-Wideband Gap (UWBG) Semiconductor that can be integrated into a battery to enable fast charging of the battery. Further, the Ultra-Wideband Gap Semiconductor may include Lithium pentagallium octaoxide ($LiGa_5O_8$). Further, Lithium pentagallium octaoxide ($LiGa_5O_8$) is a stable compound in the Li—Ga—O ternary system. Further, Lithium pentagallium octaoxide ($LiGa_5O_8$) may be imagined as 4 units of $LiGaO_2$ in which 3 units of Li are replaced with one unit of Ga to maintain the charge balance. Further, Lithium pentagallium octaoxide ($LiGa_5O_8$) may exhibit p-type conduction properties. Further, Lithium pentagallium octaoxide ($LiGa_5O_8$) is a compound with a composition in between $Ga_2O_3$ and $LiGaO_2$. Also, the y-phase of $Ga_2O_3$, which is known to have a higher band gap than the B-phase of $Ga_2O_3$, may be stabilized by adding a small amount of Lithium (Li). Further, Lithium pentagallium octaoxide ($LiGa_5O_8$) in the spinel type cubic structure is one of the best ultra-wide band gap semiconductors to have a higher band gap than any other ultra-wide band gap semiconductor materials. Also, the formation of this UWBG semiconductor may be easily achieved by n-type doping of $LiGa_5O_8$ by silicon (Si) on either a tetrahedral Ga site of $LiGa_5O_8$ or an octahedral Ga site of $LiGa_5O_8$. Further, $LiGa_5O_8$ Field-effect transistors (FETs) are suitable for use in fast chargers, as $LiGa_5O_8$ FETs can deliver high efficiency in PFC front ends and the DC/DC conversion stage. Further, the $LiGa_5O_8$ FETs may be used for implementing output rectification in high-voltage chargers. Further, the usage of $LiGa_5O_8$ FETs with low drain-source on-resistance may prove more advantageous than other UWBG semiconductors such as Silicon carbide. For example, at an operating current of 100 A with a 50% duty cycle, a SiC diode will have conduction losses of nearly 100 W, but the $LiGa_5O_8$ FET will have conduction losses of just 45 W. Further, the $LiGa_5O_8$ FETs may perform synchronous rectification, which opens the possibility of bi-directional power flow, allowing the power stored in the battery to be fed back to the grid for utility load leveling. Further, the $LiGa_5O_8$ semiconductor which is integrated into a switching device, is favorable for fast switching between the power sources connected to a power converter of a charger as compared to other UWBG semiconductors because $LiGa_5O_8$ possesses a higher band gap value compared to other UWBG semiconductors. Further, the $LiGa_5O_8$ is structurally smaller than other UWBG materials thereby allowing a compact size for components of a charger comprising $LiGa_5O_8$8 with higher output power efficiency for the charger.

FIG. 1 is a block diagram of a system 100 for managing transferring of electrical power, in accordance with some embodiments. Accordingly, the system 100 may include at least one power converter 102 and a controller 104. Further, the system may include a charging system, a charger, an electric vehicle (EV) charger, a smart charger, a smart EV charger, etc. Further, the solid line connecting components of the system 100 illustrates communicative coupling. Further, the dotted line connecting components of the system 100 illustrates electrical coupling.

Figure 2:
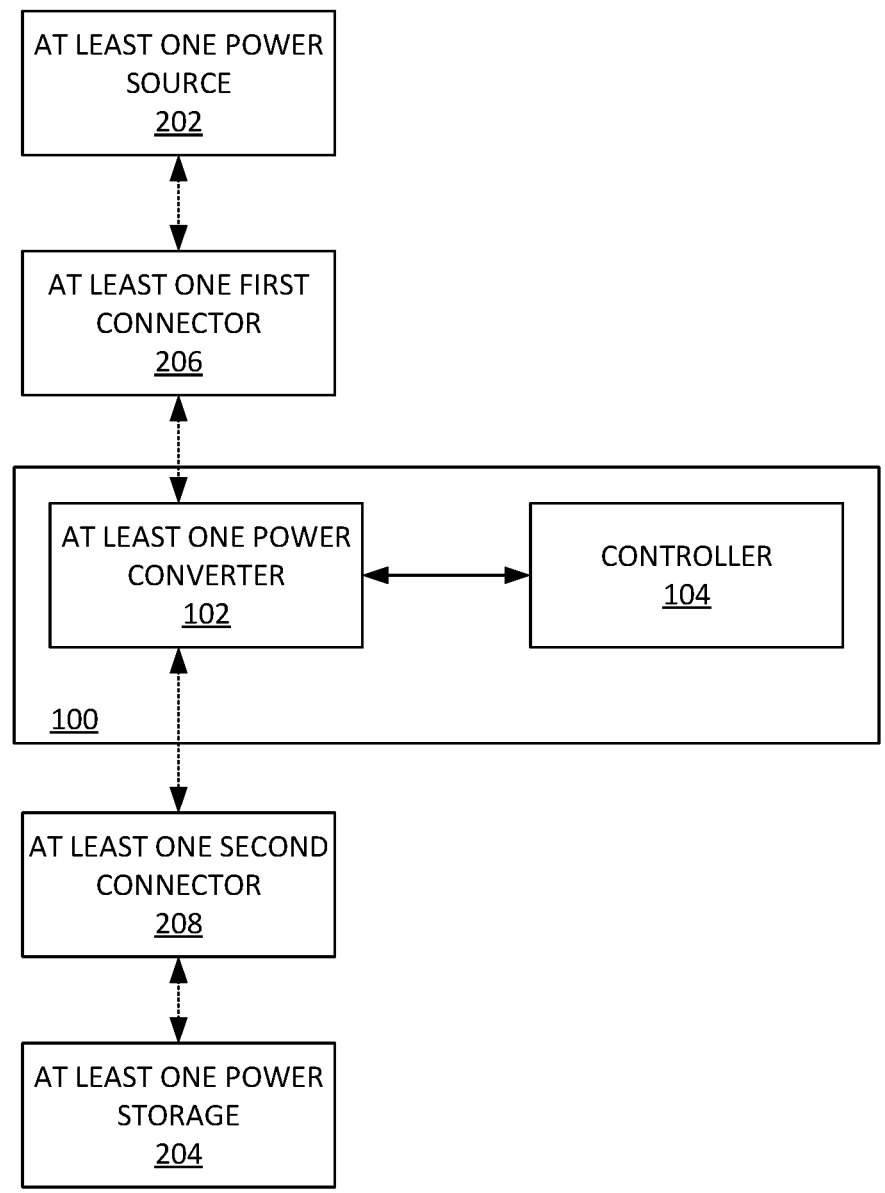
FIG. 2 is a block diagram of the system 100 for managing transferring of electrical power, in accordance with some embodiments.

Further, the at least one power converter 102 may be configured for receiving at least one input power from at least one power source 202, as shown in FIG. 2, through at least one first connector 206, as shown in FIG. 2. Further, the at least one input power may include AC electrical power, DC electrical power, etc. Further, the at least one power source 202 may include a solar photovoltaic generator (such as solar arrays, solar panels, photovoltaic panels, etc.), an electric grid, a wind turbine generator, a geothermal generator, a thermal generator, a biomass generator, an internal combustion engine generator, etc. Further, the at least one input power may be associated with at least one input power characteristic. Further, the at least one input power characteristic may include a power type (such as AC (alternating current) or DC (direct current)), a frequency, a number of phases, a voltage level, a current level, an active power component, a reactive power component, an impedance, a power factor, a rate of change of frequency, a voltage stability margin, a transmission line parameter, etc. Further, the at least one first connector 206 may include a power conductor, a bus bar, an electrical interface, a power connector, etc. Further, the at least one first connector 206 electrically couples the at least one power converter 102 with the at least one power source 202. Further, the at least one power converter 102 may be configured for converting the at least one input power to at least one output power using at least one power conversion information based on the receiving. Further, the at least one power conversion information may include an input voltage, an input current, an input power factor, an input frequency, an output voltage, an output current, an output power factor, an output frequency, a switching frequency, a modulation scheme, at least one value of at least one control parameter (such as power flow direction, switching frequency, duty cycle, phase angle, current limiting, voltage limiting, operation mode, etc.) associated with the at least one power converter 102, etc. Further, the at least one output power may be associated with at least one output power characteristic. Further, the at least one output power may include DC power or AC power. Further, the at least one output power characteristic may include a power type (such as AC (alternating current) or DC (direct current)), a frequency, a number of phases, a voltage level, a current level, an active power component, a reactive power component, an impedance, a power factor, a rate of change of frequency, a voltage stability margin, etc. Further, the at least one power converter 102 may be configured for supplying the at least one output power to at least one power storage device 204, as shown in FIG. 2, through at least one second connector 208, as shown in FIG. 2, based on the converting. Further, the at least one power storage device 204 may include at least one battery. Further, the at least one battery may be comprised in at least one electric vehicle. Further, the at least one second connector 208 may include a power conductor, a bus bar, an electrical interface, a power connector, etc. Further, the at least one second connector 208 electrically couples the at least one power converter 102 with the at least one power storage device 204. Further, the at least one power storage device 204 may include at least one ultra-wideband gap semiconductor (UWBG) material. Further, the at least one ultra-wideband gap semiconductor material may include Gallium III oxide ($Ga_2O_3$), Aluminum Gallium Nitride (AlGaN), Aluminum Nitride (AlN), Silicon carbide (SiC), Gallium Nitride (GaN), Lithium pentagallium octaoxide ($LiGa_5O_8$), etc. Further, the at least one power storage device 204 may include at least one wideband gap semiconductor material. Further, the at least one wideband gap semiconductor material may include Silicon carbide (SiC), Gallium Nitride (GaN), etc. Further, the at least one power storage device 204 may include a SiC-based lithium-ion battery, $Ga_2O_3$-based lithium-ion battery, etc. Further, the supplying of the at least one output power may include charging the at least one power storage device 204 based on the at least one output power and the at least one ultra-wideband gap semiconductor material. Further, the at least one power storage device 204 stores at least one power based on the charging. Further, the at least one power may be DC electrical power.

Further, the controller 104 may be communicatively coupled with the at least one power converter 102. Further, the controller 104 may be configured for generating the at least one power conversion information. Further, the controller 104 may be a computing device, a processing unit, a processor, a Phase-Locked Loop (PLL) controller, a proportional-integral (PI) controller, a gate driver, etc.

Figure 3:
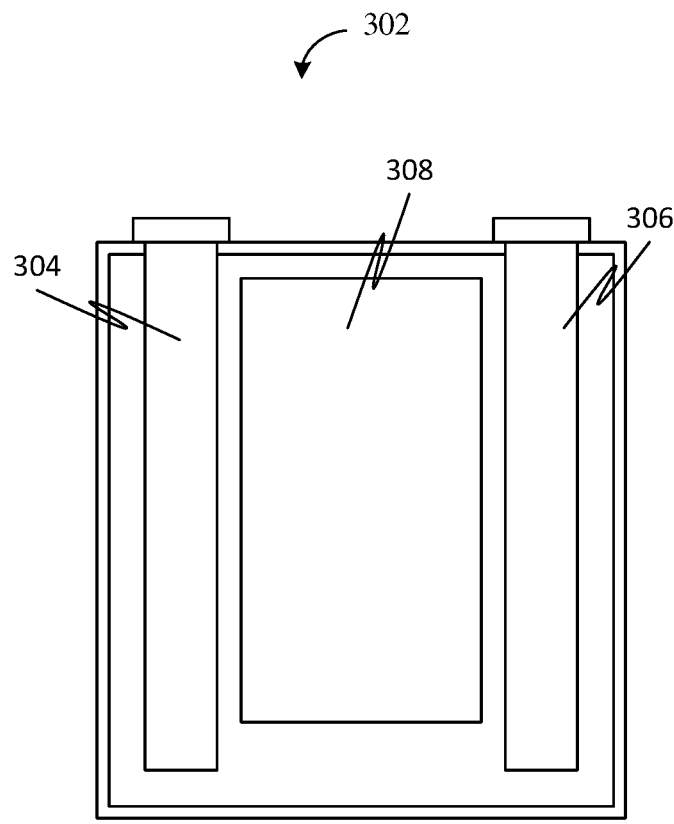
FIG. 3 is cross sectional view of the at least one battery cell 302 of the at least one power storage device 204, in accordance with some embodiments.

Further, in some embodiments, the at least one power storage device 204 may include at least one battery cell 302, as shown in FIG. 3. Further, each of the at least one battery cell 302 may include an anode 304, a cathode 306, and a separator 308, as shown in FIG. 3, disposed between the cathode 306 and the anode 304. Further, at least one of the anode 304 and the cathode 306 of the at least one battery cell 302 may include the at least one ultra-wideband gap semiconductor material. Further, the separator 308 may include at least one electrolyte material. Further, the at least one battery cell 302 may include a SiC-based lithium-ion battery cell.

Further, in an embodiment, the separator 308 of the at least one battery cell 302 may include the at least one ultra-wideband gap semiconductor material.

Figure 4:
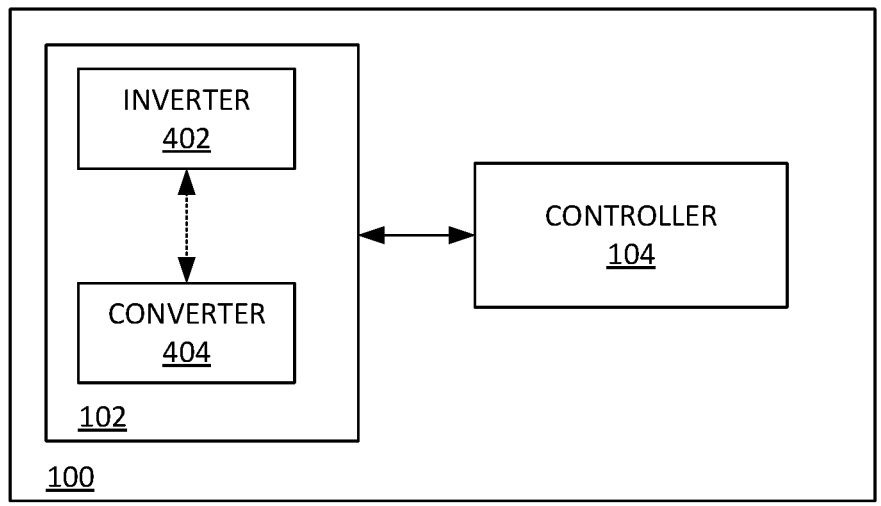
FIG. 4 is a block diagram of the system 100 for managing transferring of electrical power, in accordance with some embodiments.
Figure 5:
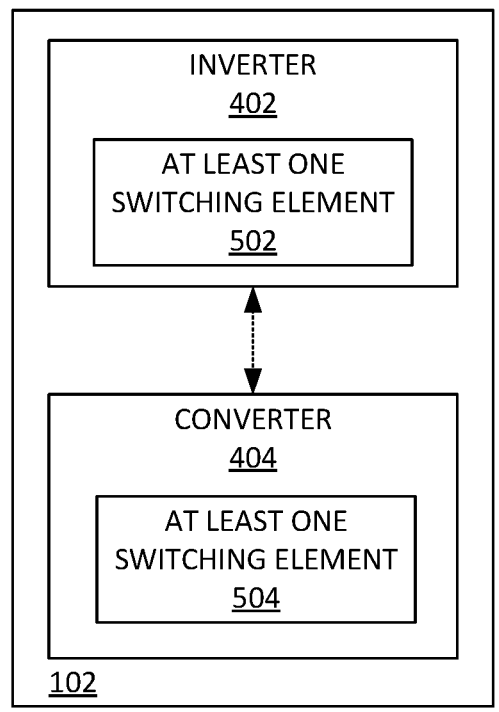
FIG. 5 is a block diagram of the at least one power converter 102 for managing transferring of electrical power, in accordance with some embodiments.

Further, in some embodiments, the at least one power converter 102 may include at least one of an inverter 402 and a converter 404, as shown in FIG. 4. Further, the inverter 402 may include a bidirectional AC-DC inverter. Further, the converter 404 may include a bidirectional DC-DC converter. Further, at least one of the inverter 402 and the converter 404 may include at least one switching element (502 and 504), as shown in FIG. 5. Further, the at least one switching element (502 and 504) may be comprised of at least one ultra-wideband gap semiconductor material. Further, the at least one switching element (502 and 504) may include SiC power metal-oxide-semiconductor field-effect transistor (MOSFET), SiC power MOSFET, SiC insulated-gate bipolar transistor (IGBT), SiC field-effect transistor (FET), $Ga_2O_3$ power MOSFET, Lithium pentagallium octaoxide ($LiGa_5O_8$) field-effect transistor (FET), etc. Further, the at least one switching element (502 and 504) may be configured for switching with at least one switching frequency based on the at least one ultra-wideband gap semiconductor material and the at least one power conversion information. Further, the at least one switching frequency may be in the range of 100 MHz to 10 GHz. Further, the at least one switching frequency may be in the range of 100 KHz to 10 MHz. Further, the converting of the at least one input power to the at least one output power may be further based on the switching.

Figure 6:
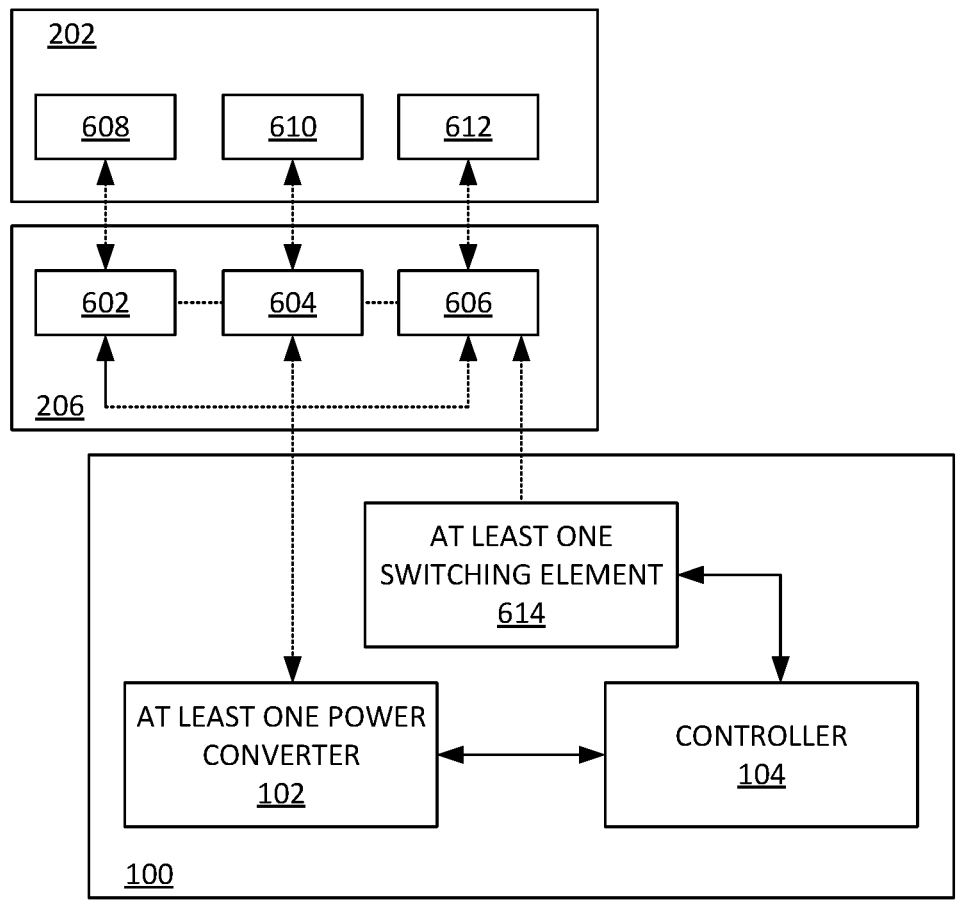
FIG. 6 is a block diagram of the system 100 for managing transferring of electrical power, in accordance with some embodiments.

Further, in some embodiments, the at least one first connector 206 may include a plurality of first connectors 602-606, as shown in FIG. 6. Further, the at least one power source 202 may include a plurality of power sources 608-612, as shown in FIG. 6. Further, each of the plurality of first connectors 602-606 electrically couples the at least one power converter 102 with each of the plurality of power sources 608-612 corresponding to each of the plurality of first connectors 602-606. Further, the system 100 may include at least one switching element 614, as shown in FIG. 6, operatively coupled with each of the plurality of first connectors 602-606. Further, the at least one switching element 614 may be electrically coupled with each of the plurality of first connectors 602-606. Further, the at least one switching element 614 may be comprised in each of the plurality of first connectors 602-606. Further, the at least one switching element 614 may include SiC MOSFET, SiC power MOSFET, SiC IGBT, SiC FET, $Ga_2O_3$ power MOSFET, $LiGa_5O_8$ FET, etc. Further, the at least one switching element 614 may be configured for establishing at least one electrical connection between the at least one power converter 102 and at least one of the plurality of power sources 608-612 through at least one of the plurality of first connectors 602-606. Further, the receiving of the at least one input power may include receiving the at least one input power from at least one of the plurality of power sources 608-612 through at least one of the plurality of input connectors based on the establishing of the at least one electrical connection between the at least one power converter 102 and at least one of the plurality of power sources 608-612 through at least one of the plurality of first connectors 602-606.

Further, in an embodiment, the controller 104 may be configured for generating at least one selection of the at least one power source 202 of the plurality of power sources 608-612. Further, the at least one selection may include at least one indication of the at least one power source 202. Further, the controller 104 may be communicatively coupled with the at least one switching element 614. Further, the at least one switching element 614 may be configured for establishing the at least one electrical connection between the at least one power converter 102 and the at least one power source 202 through the at least one first connector 206 based on the at least one selection. Further, the at least one selection corresponds to a switching action performable by the at least one switching element 614. Further, the switching action corresponds to a switch on action, a switch off action, etc. Further, the establishing of the at least one electrical connection corresponds to the switch on action.

Further, in an embodiment, the at least one selection may include a plurality of selections of the plurality of power sources 608-612. Further, the at least one switching element 614 may be configured for disconnectedly establishing the at least one electrical connection between the at least one power converter 102 and each of the plurality of power sources 608-612 through the at least one first connector 206 based on the plurality of selections in at least one manner with the at least one switching frequency. Further, the at least one manner may include an alternative manner, a sequential manner, a selective manner, etc. Further, the switching action may be performable with the at least one switching frequency.

Figure 7:
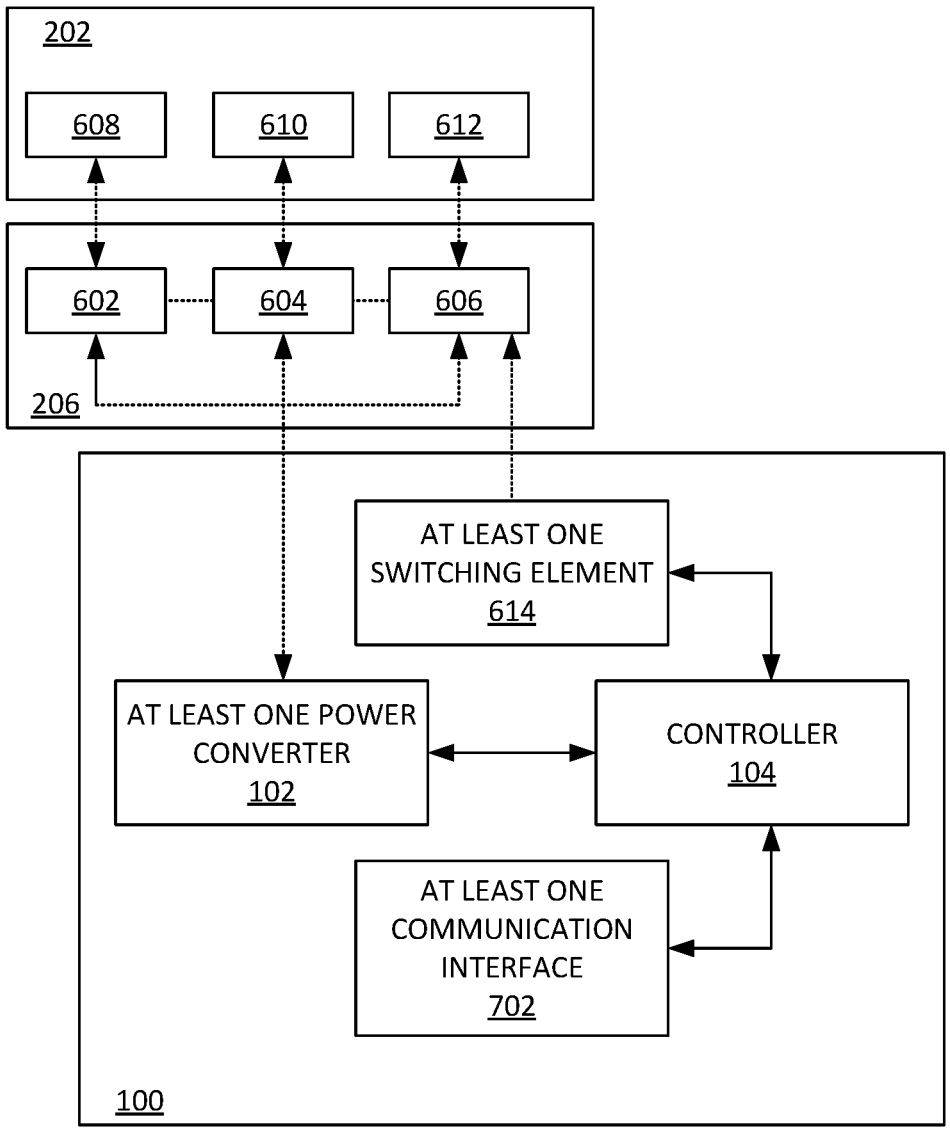
FIG. 7 is a block diagram of the system 100 for managing transferring of electrical power, in accordance with some embodiments.
Figure 8:
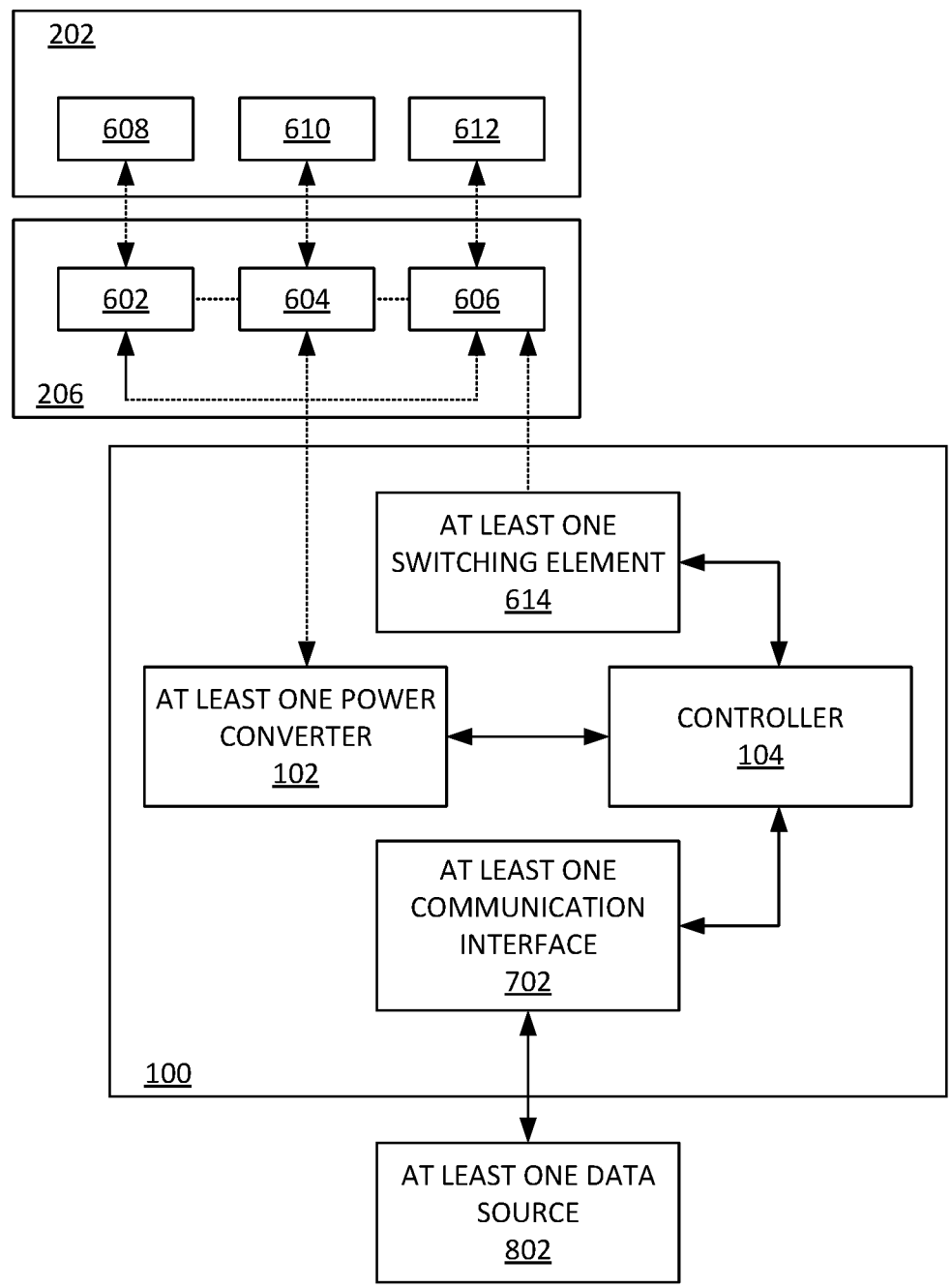
FIG. 8 is a block diagram of the system 100 for managing transferring of electrical power, in accordance with some embodiments.

Further, in an embodiment, each of a plurality of input power provided by each of the plurality of power sources 608-612 may be associated with a cost corresponding to a consumption of each of the plurality of input power per unit of time. Further, the system 100 may include at least one communication interface 702, as shown in FIG. 7, configured for receiving a plurality of cost information associated with the consumption of each of the plurality of input power provided by each of the plurality of power sources 608-612 in real time from at least one data source 802, as shown in FIG. 8. Further, the at least one data source 802 may include a computing device, a server, a database, a client device, etc. Further, the controller 104 may be communicatively coupled with the at least one communication interface 702. Further, the controller 104 may be configured for analyzing the plurality of cost information in real time. Further, the controller 104 may be configured for identifying the at least one power source 202 from the plurality of power sources 608-612 for at least one duration for the receiving of the at least one input power. Further, the cost of the at least one input power may be less than or equal to the cost of each of the plurality of input power during the at least one duration. Further, the generating of the at least one selection may be based on the identifying of the at least one power source 202.

Further, in an embodiment, the controller 104 may be configured for identifying at least one additional power source from the plurality of power sources 608-612 for at least one additional time duration after the at least one time duration based on the analyzing. Further, the controller 104 may be configured for generating at least one modified selection of the at least one additional power source based on the identifying of the at least one additional power source. Further, the at least one modified selection may include at least one indication of the at least one additional power source. Further, the at least one switching element 614 may be configured for disconnecting the at least one electrical connection between the at least one power converter 102 and the at least one power source 202 through the at least one first connector 206 based on the at least one modified selection. Further, the at least one switching element 614 may be configured for establishing at least one additional electrical connection between the at least one power converter 102 and the at least one additional power source through at least one additional connector of the at least one first connector 206 based on the disconnecting and the at least one modified selection. Further, the disconnecting of the at least one electrical connection corresponds to the switch off action.

Further, in an embodiment, the at least one communication interface 702 may be configured for communicating with the at least one data source 802 over at least one communication protocol. Further, the receiving of the plurality of cost information may be based on the communicating. Further, the at least one communication protocol may be a LoRaWAN (Long Range Wide Area Network) protocol, a Wi-Fi protocol, a Bluetooth protocol, a ZigBee protocol, etc.

Figure 9:
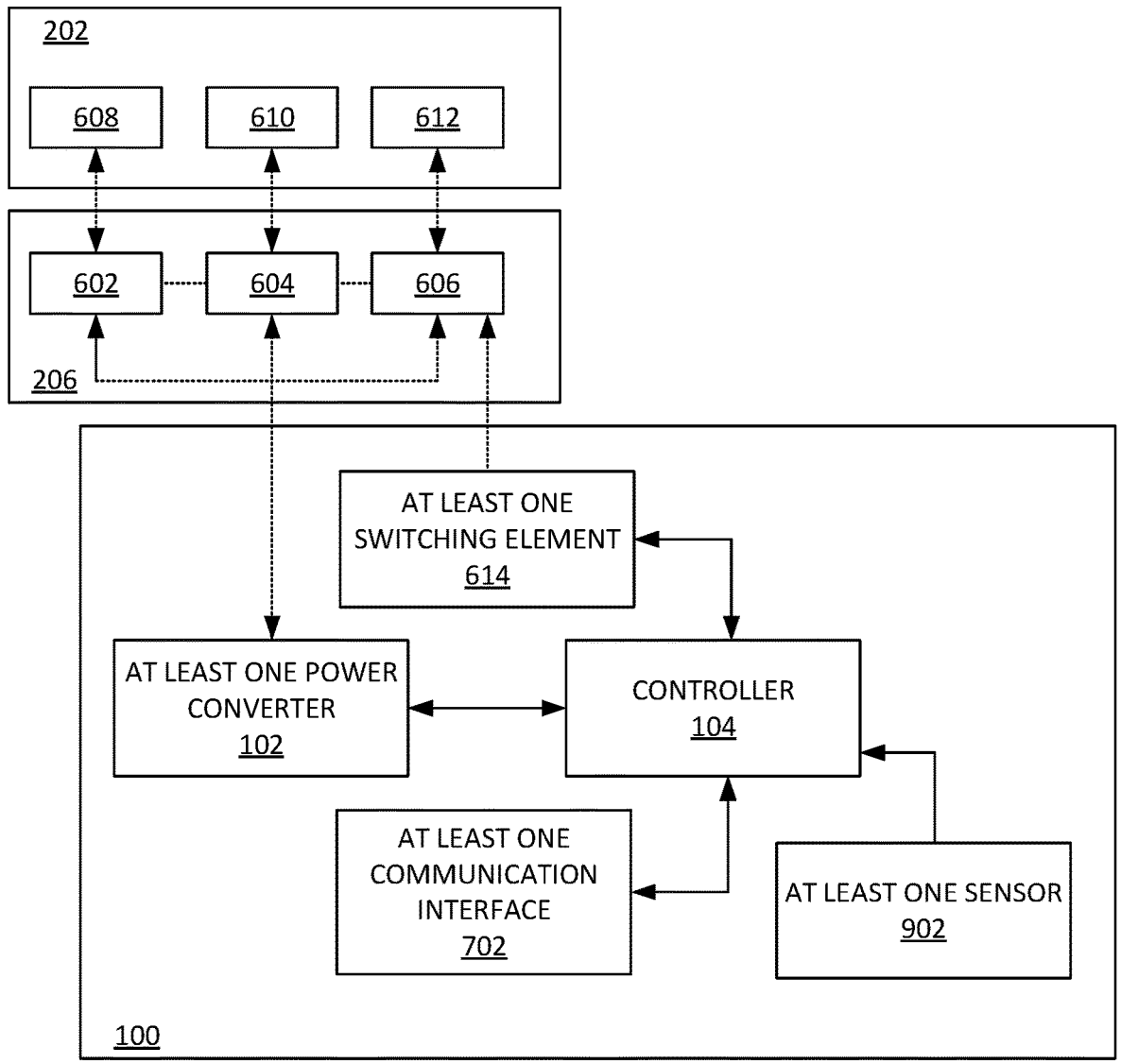
FIG. 9 is a block diagram of the system 100 for managing transferring of electrical power, in accordance with some embodiments.

In an embodiment, the system 100 may include at least one sensor 902, as shown in FIG. 9. Further, the at least one sensor 902 may be communicatively coupled with the controller 104. Further, the at least one sensor 902 may include a meteorological sensor (such as a temperature sensor, a humidity sensor, a barometric pressure sensor, a wind speed sensor, a precipitation sensor, a solar radiation sensor, a visibility sensor, a cloud height sensor, an atmospheric gas sensor, etc.), a weather sensor, etc. Further, the at least one sensor 902 may be configured for detecting at least one condition associated with an environment. Further, the at least one condition may include a temperature, a humidity, a pressure, a wind speed, a precipitation, a solar radiation, a visibility, an atmospheric gas, etc. Further, the controller 104 may be configured for generating at least one condition data associated with the at least one condition of the environment based on the detecting. Further, the at least one condition data may include a measurement value corresponding to the at least one condition. Further, the controller 104 may be configured for analyzing the at least one condition data. Further, the generating of the at least one selection of the at least one power source 202 may be based on the analyzing.

Further, in an embodiment, the analyzing of the at least one condition data may include analyzing the at least one condition data using at least one machine learning model. Further, the at least one machine learning model may be configured for detecting at least one pattern in the at least one condition data corresponding to the at least one condition. Further, the at least one machine learning model may be configured for identifying a correlation between at least one characteristic of each of the plurality of power sources 608-612 and the at least one pattern. Further, the at least one characteristic may include a power generation capacity, a load, an intermittency, a power generation efficiency, etc. Further, the at least one machine learning model may be configured for selecting the at least one power source 202 from the plurality of power sources 608-612 based on the correlation between the at least one characteristic of each of the plurality of power sources 608-612 and the at least one pattern. Further, the generating of the at least one selection may be based on the selecting.

Figure 10:
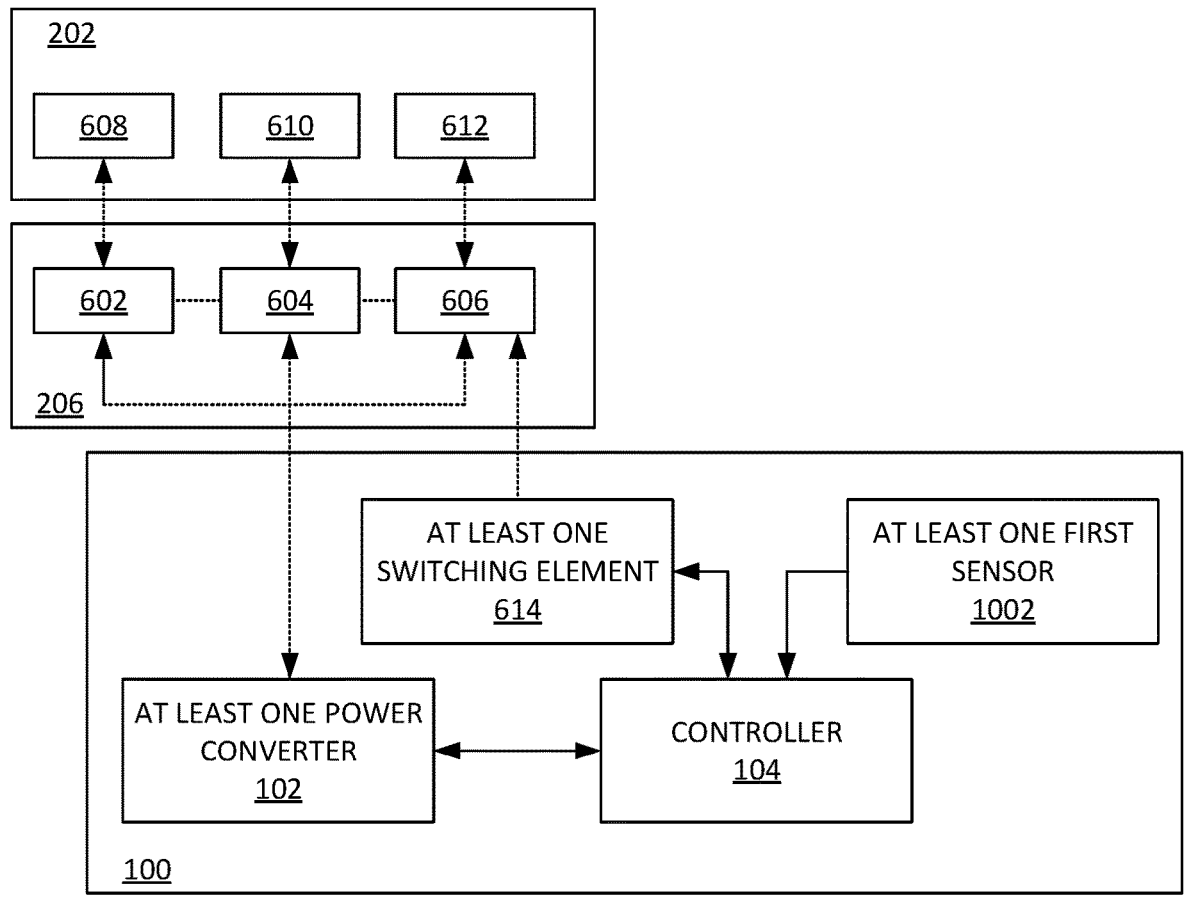
FIG. 10 is a block diagram of the system 100 for managing transferring of electrical power, in accordance with some embodiments.

In an embodiment, the system 100 may include at least one first sensor 1002, as shown in FIG. 10. Further, the at least one first sensor 1002 may be communicatively coupled with the controller 104. Further, the at least one first sensor 1002 may include a voltage sensor, a current sensor, a frequency sensor, a power quality sensor, a power factor sensor, a temperature sensor, a vibration sensor, an optical sensor, etc. Further, the at least one first sensor 1002 may be configured for detecting at least one parameter associated with each of the plurality of power sources 608-612. Further, the at least one parameter may include voltage, current, frequency, harmonics, voltage fluctuation, waveform, power factor, temperature, vibration, radiation, etc. Further, the controller 104 may be configured for generating at least one parameter data of the at least one parameter based on the detecting. Further, the at least one parameter data may include a measurement value corresponding to the at least one parameter. Further, the controller 104 may be configured for analyzing the at least one parameter data. Further, the generating of the at least one selection of at least one of the plurality of power sources 608-612 based on the analyzing.

Figure 11:
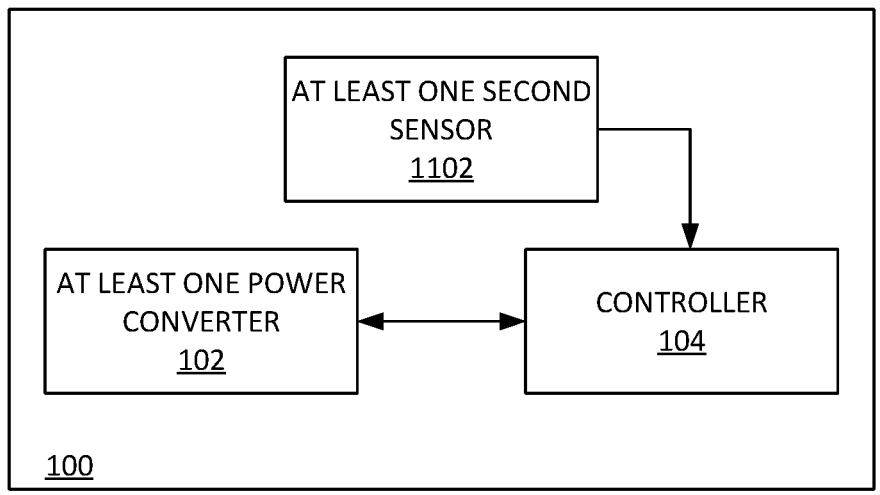
FIG. 11 is a block diagram of the system 100 for managing transferring of electrical power, in accordance with some embodiments.

In some further embodiments, the system 100 may include at least one second sensor 1102, as shown in FIG. 11. Further, the at least one second sensor 1102 may be communicatively coupled with the controller 104. Further, the at least one second sensor 1102 may include a voltage sensor, a current sensor, a temperature sensor, a state of charge sensor, a state of health sensor, an impedance sensor, a vibration sensor, etc. Further, the at least one second sensor 1102 may be configured for detecting at least one parameter associated with the at least one power storage device 204. Further, the at least one parameter may include a voltage, a current, a temperature, a state of charge, a state of health, an impedance, a vibration, etc. Further, the controller 104 may be configured for generating at least one parameter data associated with the at least one parameter based on the detecting. Further, the at least one parameter data may include a measurement value corresponding to the at least one parameter. Further, the controller 104 may be configured for analyzing the at least one parameter data. Further, the generating of the at least one power conversion information may be based on the analyzing.

Further, in some embodiments, the at least one power storage device 204 may be disconnectably connectable with the at least one power converter 102 using the at least one second connector 208. Further, the supplying of the at least one output power may be based on the connecting of the at least one power storage device 204 with the at least one power converter 102.

Figure 12:
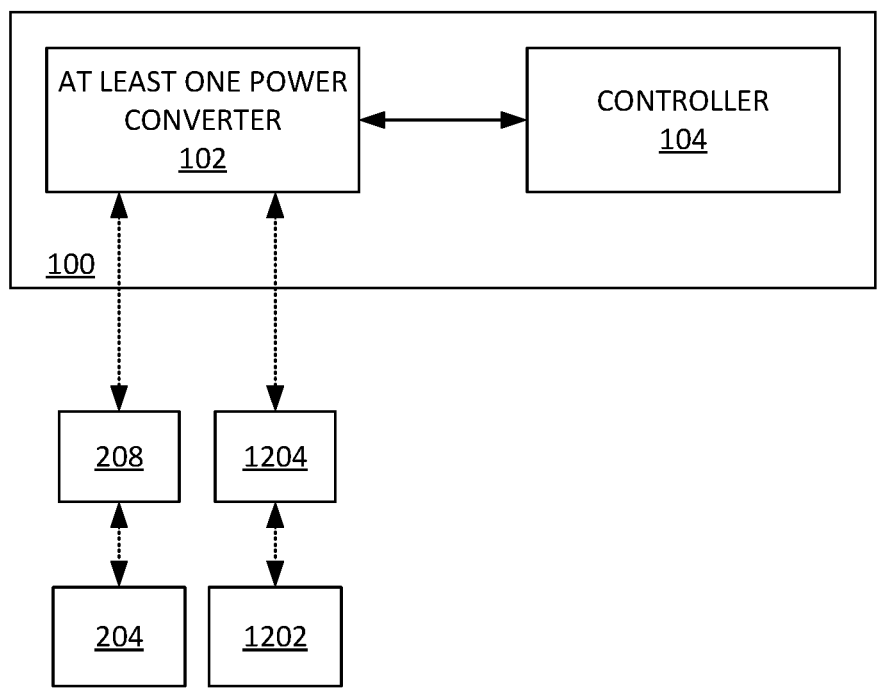
FIG. 12 is a block diagram of the system 100 for managing transferring of electrical power, in accordance with some embodiments.

Further, in an embodiment, the at least one power converter 102 may be configured for supplying the at least one output power to at least one additional power storage device 1202 through at least one additional connector 1204, as shown in FIG. 12, based on the converting and the disconnecting of the at least one power storage device 204 from the at least one power source 202. Further, the at least one additional power storage device 1202 may include a SiC-based lithium-ion battery, $Ga_2O_3$-based lithium-ion battery, $LiGa_5O_8$-based battery, etc. Further, the at least one additional power storage device 1202 may include at least one ultra-wideband gap semiconductor material. Further, the supplying of the at least one output power to the at least one additional power storage device 1202 may include charging the at least one additional power storage device 1202 based on the at least one output power and the at least one ultra-wideband gap semiconductor material. Further, the at least one additional power storage device 1202 stores at least one additional power based on the charging. Further, the at least one additional power may include DC power.

Figure 13:
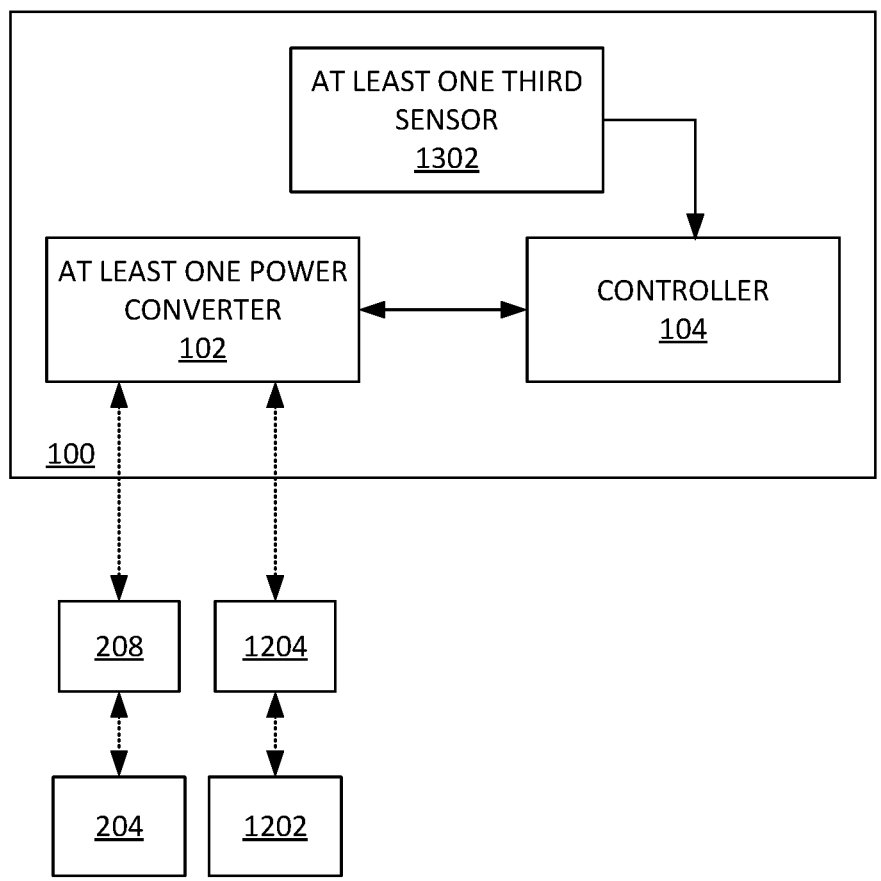
FIG. 13 is a block diagram of the system 100 for managing transferring of electrical power, in accordance with some embodiments.
Figure 14:
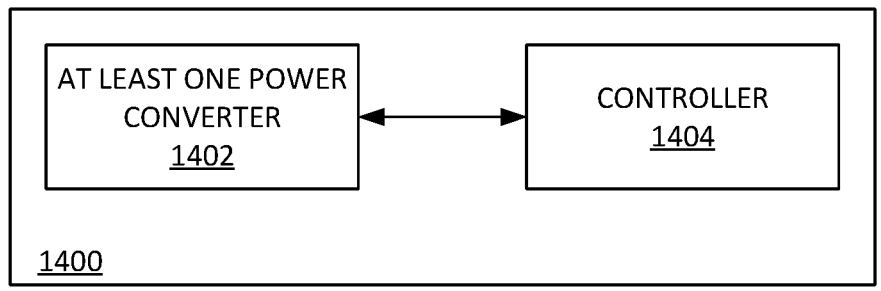
FIG. 14 is a block diagram of a system 1400 for managing transferring of electrical power, in accordance with some embodiments.

In an embodiment, the system 100 may include at least one third sensor 1302, as shown in FIG. 13. Further, the at least one third sensor 1302 may be communicatively coupled with the controller 104. Further, the at least one third sensor 1302 may include a voltage sensor, a current sensor, a frequency sensor, a power quality sensor, a power factor sensor, a temperature sensor, a vibration sensor, an optical sensor, a load sensor, etc. Further, the at least one third sensor 1302 may be configured for detecting at least one parameter associated with the at least one power source 202. Further, the at least one parameter may include voltage, current, frequency, harmonics, voltage fluctuation, waveform, power factor, temperature, vibration, radiation, etc. Further, the controller 104 may be configured for generating at least one parameter data associated with the at least one parameter based on the detecting. Further, the controller 104 may be configured for analyzing the at least one parameter data. Further, the controller 104 may be configured for determining at least one requirement of the at least one power source 202 based on the analyzing of the at least one parameter data. Further, the at least one requirement may include a load balancing, a reactive power flow, an active power flow, etc. Further, the controller 104 may be configured for generating at least one additional power conversion information based on the at least one requirement. Further, the at least one additional power conversion information may include an input voltage, an input current, an input power factor, an input frequency, an output voltage, an output current, an output power factor, an output frequency, a switching frequency, a modulation scheme, at least one value of at least one control parameter (such as power flow direction, switching frequency, duty cycle, phase angle, current limiting, voltage limiting, operation mode, etc.) associated with the at least one power converter 102, etc. Further, the at least one power converter 102 may be configured for receiving the at least one additional power from the at least one additional power storage device 1202 through the at least one additional connector 1204. Further, the at least one power converter 102 may be configured for converting the at least one additional power to at least one additional output power using the at least one additional power conversion information based on the receiving of the at least one additional power. Further, the at least one additional output power may include AC electrical power, DC electrical power, etc. Further, the at least one power converter 102 may be configured for supplying the at least one additional output power to the at least one power source 202 through the at least one first connector 206 based on the converting of the at least one additional power to the at least one additional output power. Further, the supplying of the at least one additional power meets the at least one requirement of the at least one power source 202.

Further, in an embodiment, the receiving of the at least one input power may include receiving the at least one additional power from the at least one additional power storage device 1202 through the at least one additional connector 1204. Further, the converting of the at least one input power further may include converting the at least one additional power to the at least one output power using the at least one power conversion information based on the receiving of the at least one additional power from the at least one additional power storage device 1202 through the at least one additional connector 1204. Further, the supplying of the at least one output power may be based on the converting of the at least one additional power to the at least one output power.

Further, in some embodiment, the at least one power conversion information may be characterized by at least one charging parameter associated with the charging of the at least one power storage device 204. Further, the at least one output power characteristic may be defined by the at least one power conversion information. Further, the at least one charging parameter may include a charging voltage, a charging current, a charging time, a charging temperature, a charging profile, a charging rate, etc.

Further, the system 1400 may include at least one power converter 1402 and a controller 1404. Further, the solid line connecting components of the system 1400 illustrates communicative coupling. Further, the dotted line connecting components of the system 1400 illustrates electrical coupling.

Further, the at least one power converter 1402 may be configured for receiving at least one input power from at least one power source through at least one first connector. Further, the at least one input power may be associated with at least one input power characteristic. Further, the at least one first connector electrically couples the at least one power converter 1402 with the at least one power source. Further, the at least one power converter 1402 may be configured for converting the at least one input power to at least one output power using at least one power conversion information based on the receiving. Further, the at least one output power may be associated with at least one output power characteristic. Further, the at least one power converter 1402 may be configured for supplying the at least one output power to at least one power storage device through at least one second connector based on the converting. Further, the at least one second connector electrically couples the at least one power converter 1402 with the at least one power storage device. Further, the at least one power storage device may include at least one ultra-wideband gap semiconductor material. Further, the at least one power storage device may include at least one battery cell. Further, each of the at least one battery cell may include an anode, a cathode, and a separator disposed between the cathode and the anode. Further, the cathode of the at least one battery cell may include the at least one ultra-wideband gap semiconductor material. Further, the supplying of the at least one output power may include charging the at least one power storage device based on the at least one output power and the at least one ultra-wideband gap semiconductor material. Further, the at least one power storage device stores at least one power based on the charging.

Further, the controller 1404 may be communicatively coupled with the at least one power converter 1402. Further, the controller 1404 may be configured for generating the at least one power conversion information.

Figure 15:
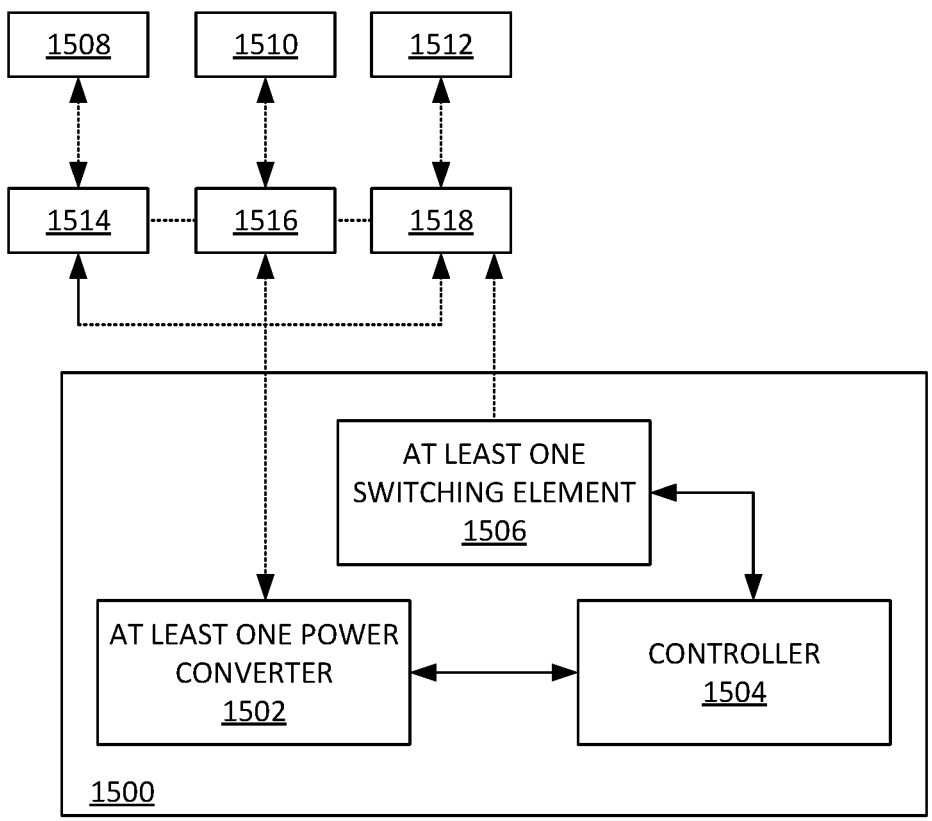
FIG. 15 is a block diagram of a system 1500 for managing transferring of electrical power, in accordance with some embodiments.

FIG. 15 is a block diagram of a system 1500 for managing transferring of electrical power, in accordance with some embodiments. Accordingly, the system 1500 may include at least one power converter 1502, a controller 1504, and at least one switching element 1506. Further, the solid line connecting components of the system 1500 illustrates communicative coupling. Further, the dotted line connecting components of the system 1500 illustrates electrical coupling.

Further, the at least one power converter 1502 may be configured for receiving at least one input power from at least one of a plurality of power sources 1508-1512 through at least one of a plurality of first connectors 1514-1518. Further, the at least one input power may be associated with at least one input power characteristic. Further, at least one of the plurality of first connectors 1514-1518 electrically couples the at least one power converter 1502 with at least one of the plurality of power sources 1508-1512. Further, the at least one power converter 1502 may be configured for converting the at least one input power to at least one output power using at least one power conversion information based on the receiving. Further, the at least one output power may be associated with at least one output power characteristic. Further, the at least one power converter 1502 may be configured for supplying the at least one output power to at least one power storage device through at least one second connector based on the converting. Further, the at least one second connector electrically couples the at least one power converter 1502 with the at least one power storage device. Further, the at least one power storage device may include at least one ultra-wideband gap semiconductor material. Further, the supplying of the at least one output power may include charging the at least one power storage device based on the at least one output power and the at least one ultra-wideband gap semiconductor material. Further, the at least one power storage device stores at least one power based on the charging.

Further, the controller 1504 may be communicatively coupled with the at least one power converter 1502. Further, the controller 1504 may be configured for generating the at least one power conversion information.

Further, the at least one switching element 1506 may be operatively coupled with each of the plurality of first connectors 1514-1518. Further, the at least one switching element 1506 may be configured for establishing at least one electrical connection between the at least one power converter 1502 and at least one of the plurality of power sources 1508-1512 through at least one of the plurality of first connectors 1514-1518. Further, the receiving of the at least one input power may be based on the establishing of the at least one electrical connection between the at least one power converter 1502 and at least one of the plurality of power sources 1508-1512 through at least one of the plurality of first connectors 1514-1518.

Figure 16:
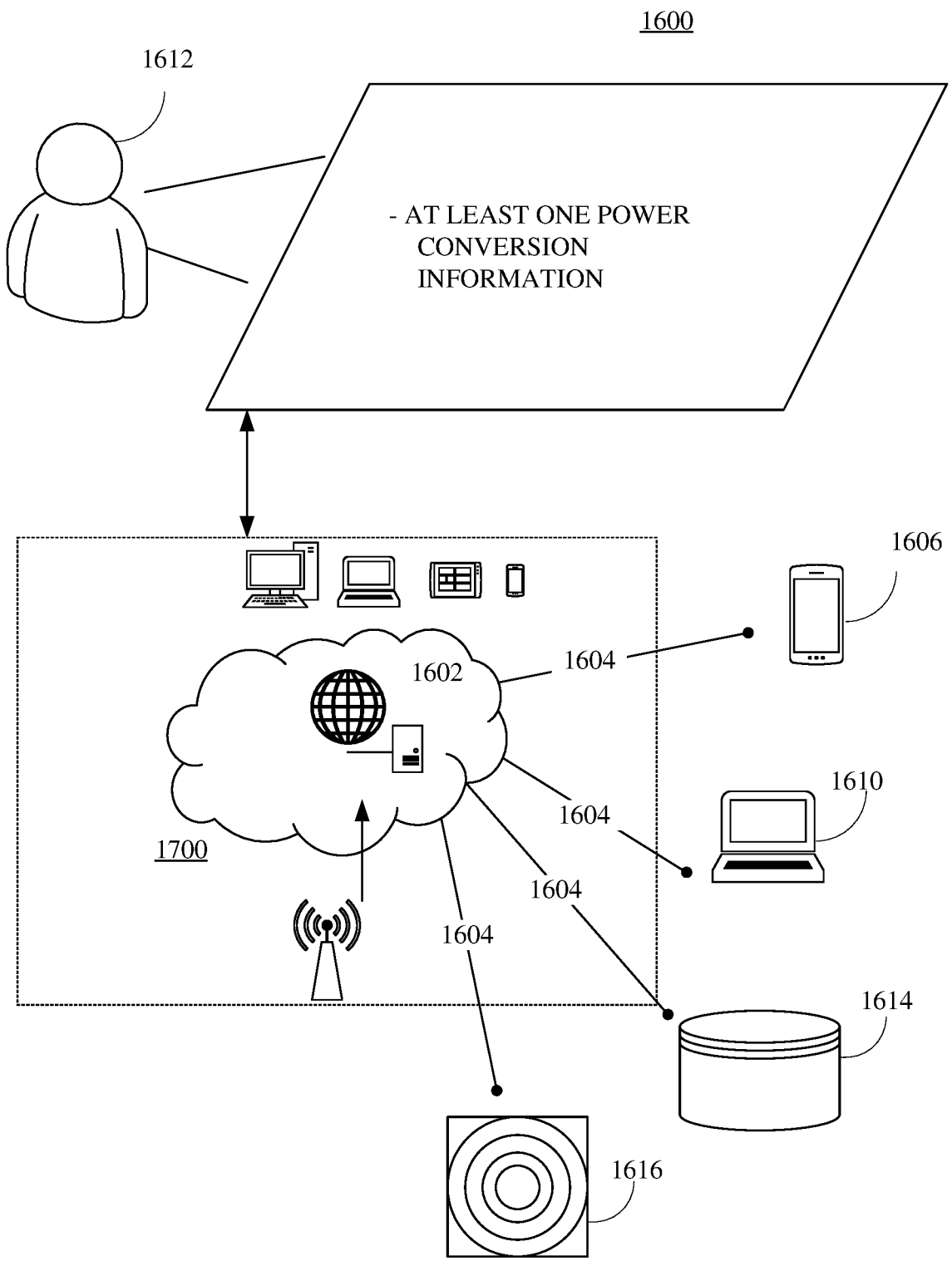
FIG. 16 is an illustration of an online platform 1600 consistent with various embodiments of the present disclosure.

FIG. 16 is an illustration of an online platform 1600 consistent with various embodiments of the present disclosure. By way of non-limiting example, the online platform 1600 to manage transferring of electrical power may be hosted on a centralized server 1602, such as, for example, a cloud computing service. The centralized server 1602 may communicate with other network entities, such as, for example, a mobile device 1606 (such as a smartphone, a laptop, a tablet computer, etc.), other electronic devices 1610 (such as desktop computers, server computers, etc.), databases 1614, and sensors 1616 over a communication network 1604, such as, but not limited to, the Internet. Further, users of the online platform 1600 may include relevant parties such as, but not limited to, end-users, administrators, service providers, service consumers, and so on. Accordingly, in some instances, electronic devices operated by the one or more relevant parties may be in communication with the platform.

A user 1612, such as the one or more relevant parties, may access online platform 1600 through a web based software application or browser. The web based software application may be embodied as, for example, but not be limited to, a website, a web application, a desktop application, and a mobile application compatible with a computing device 1700.

Figure 17:
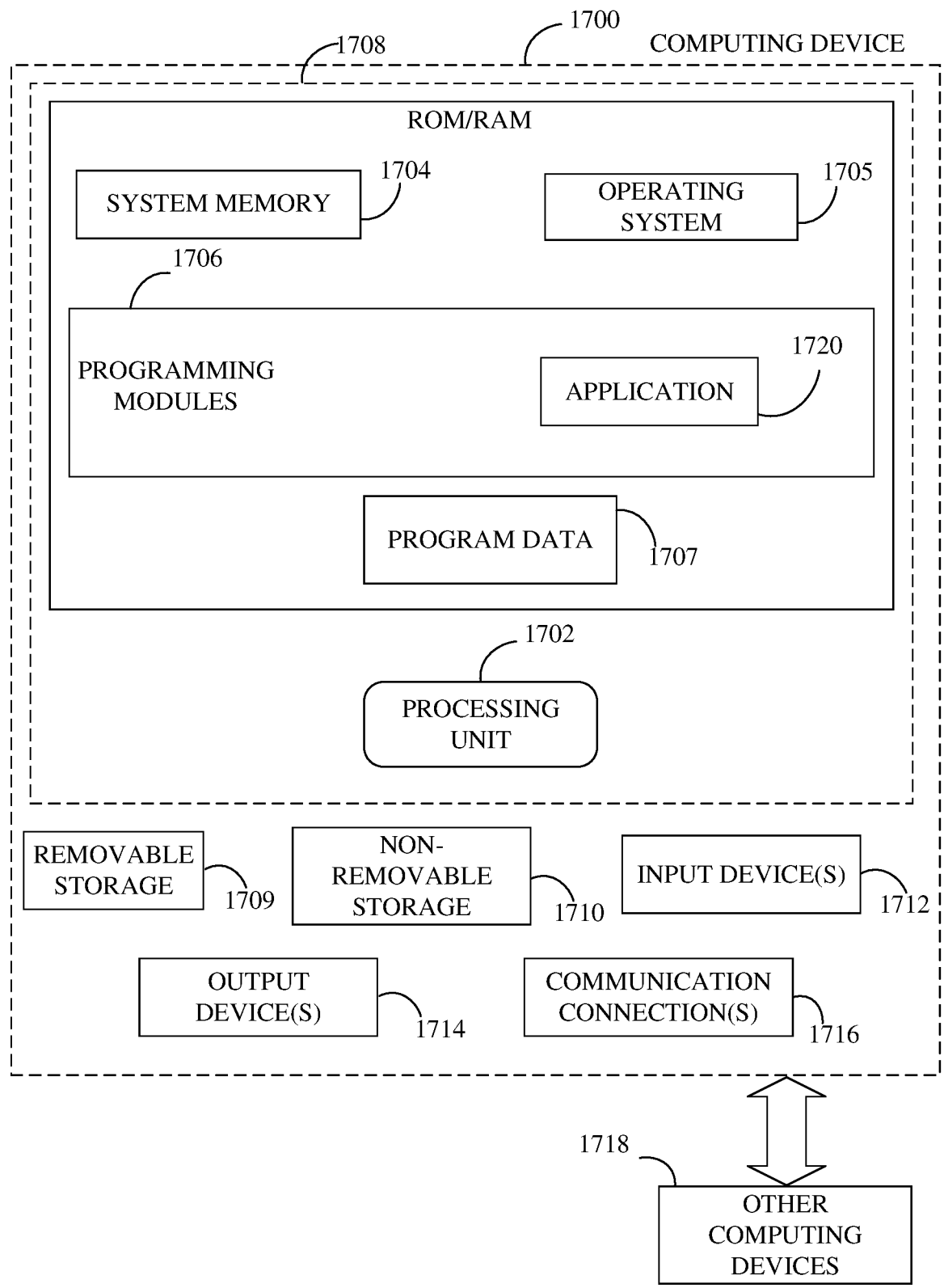
FIG. 17 is a block diagram of a computing device 1700 for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for managing transferring of electrical power, the system comprising:
    at least one power converter configured for:
        receiving at least one input power from at least one power source through at least one first connector, wherein the at least one input power is associated with at least one input power characteristic, wherein the at least one first connector electrically couples the at least one power converter with the at least one power source;
        converting the at least one input power to at least one output power using at least one power conversion information based on the receiving, wherein the at least one output power is associated with at least one output power characteristic; and
        supplying the at least one output power to at least one power storage device through at least one second connector based on the converting, wherein the at least one second connector electrically couples the at least one power converter with the at least one power storage device, wherein the at least one power storage device comprises at least one ultra-wideband gap semiconductor material, wherein the supplying of the at least one output power comprises charging the at least one power storage device based on the at least one output power and the at least one ultra-wideband gap semiconductor material, wherein the at least one power storage device stores at least one power based on the charging; and
    a controller communicatively coupled with the at least one power converter, wherein the controller is configured for generating the at least one power conversion information.

2. The system of claim 1, wherein the at least one power storage device comprises at least one battery cell, wherein each of the at least one battery cell comprises an anode, a cathode, and a separator disposed between the cathode and the anode, wherein at least one of the anode and the cathode of the at least one battery cell comprises the at least one ultra-wideband gap semiconductor material.

3. The system of claim 2, wherein the separator of the at least one battery cell comprises the at least one ultra-wideband gap semiconductor material.

4. The system of claim 1, wherein the at least one power converter comprises at least one of an inverter and a converter, wherein at least one of the inverter and the converter comprises at least one switching element, wherein the at least one switching element is comprised of at least one ultra-wideband gap semiconductor material, wherein the at least one switching element is configured for switching with at least one switching frequency based on the at least one ultra-wideband gap semiconductor material and the at least one power conversion information, wherein the converting of the at least one input power to the at least one output power is further based on the switching.

5. The system of claim 1, wherein the at least one first connector comprises a plurality of first connectors, wherein the at least one power source comprises a plurality of power sources, wherein each of the plurality of first connectors electrically couples the at least one power converter with each of the plurality of power sources corresponding to each of the plurality of first connectors, wherein the system further comprises at least one switching element operatively coupled with each of the plurality of first connectors, wherein the at least one switching element is configured for establishing at least one electrical connection between the at least one power converter and at least one of the plurality of power sources through at least one of the plurality of first connectors, wherein the receiving of the at least one input power comprises receiving the at least one input power from at least one of the plurality of power sources through at least one of the plurality of input connectors based on the establishing of the at least one electrical connection between the at least one power converter and at least one of the plurality of power sources through at least one of the plurality of first connectors.

6. The system of claim 5, wherein the controller is further configured for generating at least one selection of the at least one power source of the plurality of power sources, wherein the at least one selection comprises at least one indication of the at least one power source, wherein the controller is communicatively coupled with the at least one switching element, wherein the at least one switching element is further configured for establishing the at least one electrical connection between the at least one power converter and the at least one power source through the at least one first connector based on the at least one selection.

7. The system of claim 6, wherein each of a plurality of input power provided by each of the plurality of power sources is associated with a cost corresponding to a consumption of each of the plurality of input power per unit of time, wherein the system further comprises at least one communication interface configured for receiving a plurality of cost information associated with the consumption of each of the plurality of input power provided by each of the plurality of power sources in real time from at least one data source, wherein the controller is communicatively coupled with the at least one communication interface, wherein the controller is further configured for:
    analyzing the plurality of cost information in real time; and
    identifying the at least one power source from the plurality of power sources for at least one duration for the receiving of the at least one input power, wherein the cost of the at least one input power is less than or equal to the cost of each of the plurality of input power during the at least one duration, wherein the generating of the at least one selection is further based on the identifying of the at least one power source.

8. The system of claim 7, wherein the controller is further configured for:
    identifying at least one additional power source from the plurality of power sources for at least one additional time duration after the at least one time duration based on the analyzing;
    generating at least one modified selection of the at least one additional power source based on the identifying of the at least one additional power source, wherein the at least one modified selection comprises at least one indication of the at least one additional power source, wherein the at least one switching element is further configured for:
    disconnecting the at least one electrical connection between the at least one power converter and the at least one power source through the at least one first connector based on the at least one modified selection; and establishing at least one additional electrical connection between the at least one power converter and the at least one additional power source through at least one additional connector of the at least one first connector based on the disconnecting and the at least one modified selection.

9. The system of claim 7, wherein the at least one communication interface is configured for communicating with the at least one data source over at least one communication protocol, wherein the receiving of the plurality of cost information is based on the communicating.

10. The system of claim 6 further comprising at least one sensor communicatively coupled with the controller, wherein the at least one sensor is configured for detecting at least one condition associated with an environment, wherein the controller is further configured for:

generating at least one condition data associated with the at least one condition of the environment based on the detecting; and analyzing the at least one condition data, wherein the generating of the at least one selection of the at least one power source is based on the analyzing.

11. The system of claim 10, wherein the analyzing of the at least one condition data comprises analyzing the at least one condition data using at least one machine learning model, wherein the at least one machine learning model is configured for:

detecting at least one pattern in the at least one condition data corresponding to the at least one condition;

identifying a correlation between at least one characteristic of each of the plurality of power sources and the at least one pattern; and selecting the at least one power source from the plurality of power sources based on the correlation between the at least one characteristic of each of the plurality of power sources and the at least one pattern, wherein the generating of the at least one selection is further based on the selecting.

12. The system of claim 5 further comprising at least one first sensor communicatively coupled with the controller, wherein the at least one first sensor is configured for detecting at least one parameter associated with each of the plurality of power sources, wherein the controller is further configured for:

generating at least one parameter data of the at least one parameter based on the detecting; and analyzing the at least one parameter data, wherein the generating of the at least one selection of at least one of the plurality of power sources based on the analyzing.

13. The system of claim 1 further comprising at least one second sensor communicatively coupled with the controller, wherein the at least one second sensor is configured for detecting at least one parameter associated with the at least one power storage device, wherein the controller is further configured for:

generating at least one parameter data associated with the at least one parameter based on the detecting; and analyzing the at least one parameter data, wherein the generating of the at least one power conversion information is further based on the analyzing.

14. The system of claim 1, wherein the at least one power storage device is disconnectably connectable with the at least one power converter using the at least one second connector, wherein the supplying of the at least one output power is based on the connecting of the at least one power storage device with the at least one power converter.

15. The system of claim 14, wherein the at least one power converter is further configured for supplying the at least one output power to at least one additional power storage device through at least one additional connector based on the converting and the disconnecting of the at least one power storage device from the at least one power source, wherein the at least one additional power storage device comprises at least one ultra-wideband gap semiconductor material, wherein the supplying of the at least one output power to the at least one additional power storage device comprises charging the at least one additional power storage device based on the at least one output power and the at least one ultra-wideband gap semiconductor material, wherein the at least one additional power storage device stores at least one additional power based on the charging.

16. The system of claim 15 further comprising at least one third sensor communicatively coupled with the controller, wherein the at least one third sensor is configured for detecting at least one parameter associated with the at least one power source, wherein the controller is further configured for:

generating at least one parameter data associated with the at least one parameter based on the detecting;

analyzing the at least one parameter data;

determining at least one requirement of the at least one power source based on the analyzing of the at least one parameter data; and generating at least one additional power conversion information based on the at least one requirement, wherein the at least one power converter is further configured for:

receiving the at least one additional power from the at least one additional power storage device through the at least one additional connector;

converting the at least one additional power to at least one additional output power using the at least one additional power conversion information based on the receiving of the at least one additional power; and supplying the at least one additional output power to the at least one power source through the at least one first connector based on the converting of the at least one additional power to the at least one additional output power, wherein the supplying of the at least one additional power meets the at least one requirement of the at least one power source.

17. The system of claim 15, wherein the receiving of the at least one input power further comprises receiving the at least one additional power from the at least one additional power storage device through the at least one additional connector, wherein the converting of the at least one input power further comprises converting the at least one additional power to the at least one output power using the at least one power conversion information based on the receiving of the at least one additional power from the at least one additional power storage device through the at least one additional connector, wherein the supplying of the at least one output power is further based on the converting of the at least one additional power to the at least one output power.

18. The system of claim 1, wherein the at least one power conversion information is characterized by at least one charging parameter associated with the charging of the at least one power storage device, wherein the at least one output power characteristic is defined by the at least one power conversion information.

19. A system for managing transferring of electrical power, the system comprising:
at least one power converter configured for:
receiving at least one input power from at least one power source through at least one first connector, wherein the at least one input power is associated with at least one input power characteristic, wherein the at least one first connector electrically couples the at least one power converter with the at least one power source;
converting the at least one input power to at least one output power using at least one power conversion information based on the receiving, wherein the at least one output power is associated with at least one output power characteristic; and
supplying the at least one output power to at least one power storage device through at least one second connector based on the converting, wherein the at least one second connector electrically couples the at least one power converter with the at least one power storage device, wherein the at least one power storage device comprises at least one ultra-wideband gap semiconductor material, wherein the at least one power storage device comprises at least one battery cell, wherein each of the at least one battery cell comprises an anode, a cathode, and a separator disposed between the cathode and the anode, wherein at least one of the anode and the cathode of the at least one battery cell comprises the at least one ultra-wideband gap semiconductor material, wherein the supplying of the at least one output power comprises charging the at least one power storage device based on the at least one output power and the at least one ultra-wideband gap semiconductor material, wherein the at least one power storage device stores at least one power based on the charging; and
a controller communicatively coupled with the at least one power converter, wherein the controller is configured for generating the at least one power conversion information.

20. A system for managing transferring of electrical power, the system comprising:
at least one power converter configured for:
receiving at least one input power from at least one of a plurality of power sources through at least one of a plurality of first connectors, wherein the at least one input power is associated with at least one input power characteristic, wherein at least one of the plurality of first connectors electrically couples the at least one power converter with at least one of the plurality of power sources;
converting the at least one input power to at least one output power using at least one power conversion information based on the receiving, wherein the at least one output power is associated with at least one output power characteristic; and
supplying the at least one output power to at least one power storage device through at least one second connector based on the converting, wherein the at least one second connector electrically couples the at least one power converter with the at least one power storage device, wherein the at least one power storage device comprises at least one ultra-wideband gap semiconductor material, wherein the supplying of the at least one output power comprises charging the at least one power storage device based on the at least one output power and the at least one ultra-wideband gap semiconductor material, wherein the at least one power storage device stores at least one power based on the charging;
a controller communicatively coupled with the at least one power converter, wherein the controller is configured for generating the at least one power conversion information; and
at least one switching element operatively coupled with each of the plurality of first connectors, wherein the at least one switching element is configured for establishing at least one electrical connection between the at least one power converter and at least one of the plurality of power sources through at least one of the plurality of first connectors, wherein the receiving of the at least one input power is based on the establishing of the at least one electrical connection between the at least one power converter and at least one of the plurality of power sources through at least one of the plurality of first connectors.

* * * * *